March 4, 1969 R. L. PROPST ET AL 3,430,997
PANEL JOINT

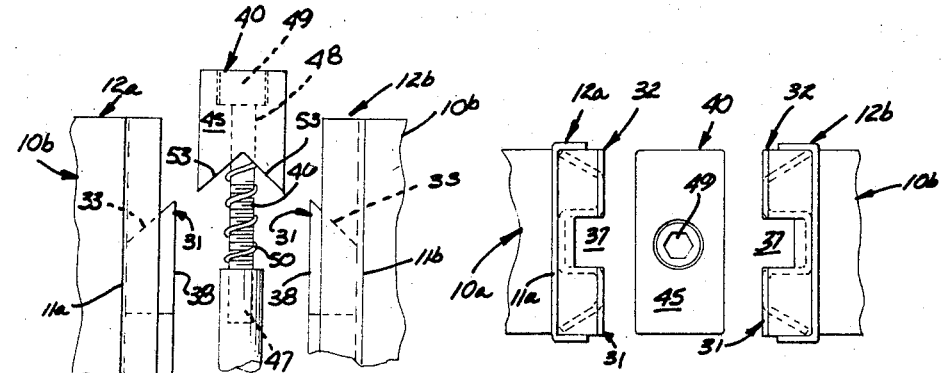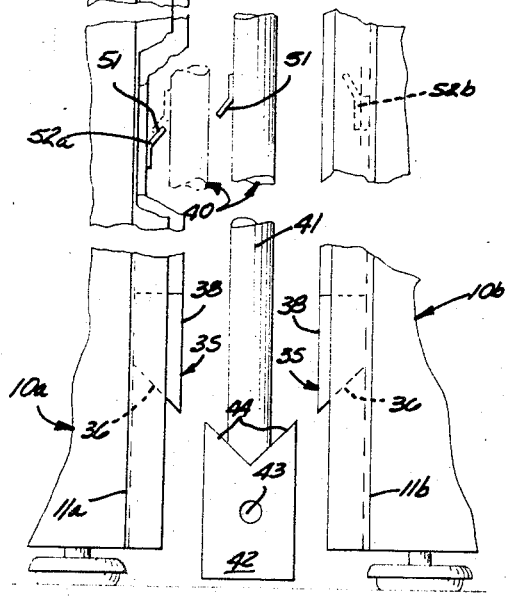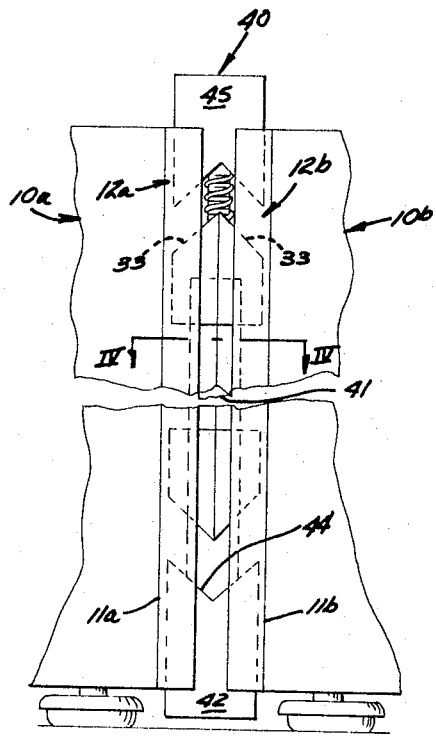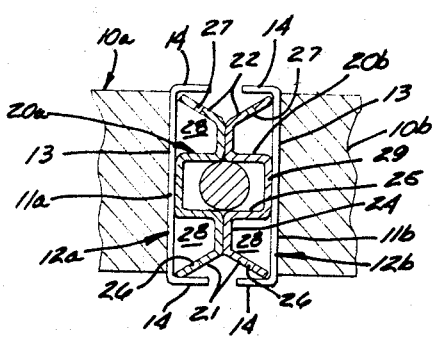

Filed March 17, 1967 Sheet 2 of 3

INVENTORS
ROBERT L. PROPST
JAMES O. KELLEY
BY Price, Heneveld,
Huizenga & Cooper
ATTORNEYS March 4, 1969  R. L. PROPST ET AL  3,430,997
PANEL JOINT
Filed March 17, 1967  Sheet 3 of 3
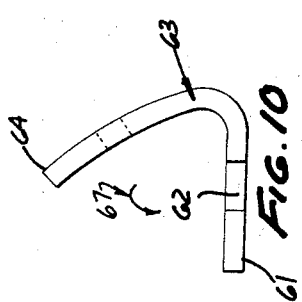
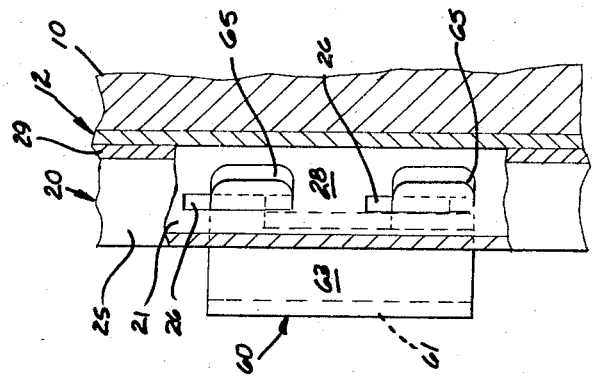
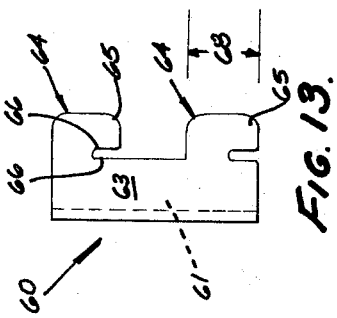
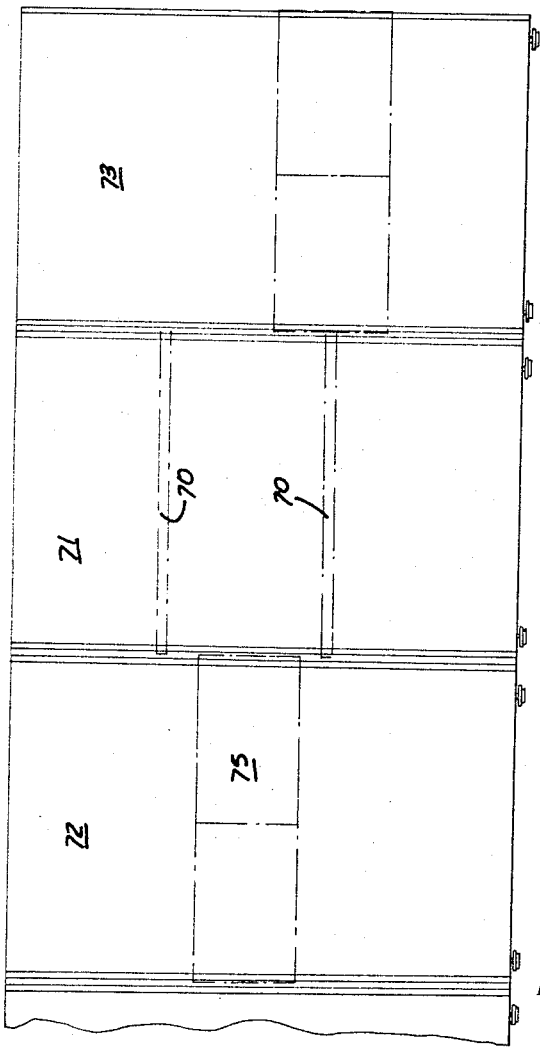
INVENTORS
ROBERT L. PROPST
JAMES O. KELLEY
BY
ATTORNEYS

United States Patent Office 3,430,997
Patented Mar. 4, 1969

3,430,997
PANEL JOINT
Robert L. Propst, Ann Arbor, and James O. Kelley,
Saline, Mich., assignors to Herman Miller Inc.,
Zeeland, Mich., a corporation of Michigan
Filed Mar. 17, 1967, Ser. No. 623,878
U.S. Cl. 287—189.36        10 Claims
Int. Cl. F16b 1/00, 2/24; A47g 29/02

ABSTRACT OF THE DISCLOSURE

Each of the panels in a space divider system is provided with upper and lower wedge blocks. The upper wedge blocks have an inclined surface directed upwardly and away from their associated panel edges while the lower wedge blocks have an inclined surface directed downwardly and away from their associated panel edges. When the panels are butted together, the adjacent upper and lower wedge blocks each form opposed, generally triangular wedging surfaces. Upper and lower draw blocks, having generally V-shaped recesses therein adapted to fit over and compress the upper and lower wedge blocks together, are connected by an elongated tie bar. The tie bar has a screw therein affective to shorten or lengthen selectively its vertical dimensions. The draw blocks are drawn together by means of the tie bar to force the wedge blocks into closer and closer relationship with one another, thus rigidifying the panel joint.

Each of the panel edges is provided, additionally, with a channular recess wherein there is positioned an elongated hanger frame. The hanger frame comprises a pair of elongated box-like beams, each having a surface extending from the interior base of the flange and forming an open area between the base of the recess and the surface. Each of the surfaces is provided with a plurality of vertically aligned slots and a hanger clip, having a curved shank with at least two hook portions thereon, is adapted to be inserted into the slot by rotating the shank portion about vertical axes to clear the adjacent flange till the hook portions pass into the open areas. The hanger clip is then dropped downwardly for positive engagement with the hanger frame. In this manner, an accessory article may be supported from each edge of a single panel independently of the panel joint and, thus, the accessory article need not be removed when the panel joints are unlocked for rearrangement of the system. It is understood that this abstract is not to be utilized to limit the scope of this invention.

Background

This invention relates to space divider systems and, more particularly, to such systems embodying a plurality of vertically oriented panels and other types of components adapted to be interlocked at their adjacent edges in any desired enclosure-dividing configuration. The concept involves, additionally, the provision of wall-supported accessory anchoring channels at various locations within the system wherefrom various types of furniture or other accessories may be supported.

In co-pending application Ser. No. 526,146, filed Feb. 9, 1966 and assigned to the same assignee as the present application, there is disclosed a space divider system wherein the adjacent components are interlocked by means of a novel spline or connector assembly arranged to be drawn upwardly under the influence of a bolt or the like to interlock rigidly the adjacent components. In the device disclosed in that application, an anchoring channel, formed by the structural cooperation of adjacent panels, is provided at each component juncture wherefrom wall-hung accessories may be supported by suitable gripping devices. The instant invention comprises, basically, an improvement and/or modification of the device shown in the noted co-pending application.

Objects and specification

It is an object of this invention to provide a connecting joint for space divider components which rigidly positions the components with respect to one another and, yet, which may be readily unlocked to permit re-assembly of the components in accordance with a differing layout scheme designed to meet changing needs.

More particularly, it is an object of this invention to provide a space divider component joint which may be assembled and disassembled by a single person.

It is an object of this invention to provide a joint of the type described wherein the heavier components such as divider panels may be interlocked without lifting them vertically with respect to one another or to the connecting device.

It is an object of this invention to provide a joint of the type described having components which may be affixed to the panels and other more-or-less stock materials at the site of the installation, thus allowing them to be procured locally to reduce shipping and purchase costs.

It is yet another object of this invention to provide a system of the type described embodying a unique wall-hung accessory mounting scheme wherein the retaining characteristics of the anchoring member are not dependent upon the abutment of two separate panels or other components for existence.

Thus, it is an object of this invention to provide a system of the type described wherein any particular wall-hung accessory may be supported from a single panel independently of its interconnection with adjacent panels and, thus, wherein the necessity for removing such accessories prior to rearranging the space-division confifuration is obviated.

It is an object of this invention to provide a system of the type described wherein two vertically oriented accessory anchoring members are positioned on either side of the divider components at each component joint and, thus, wherein accessories may be independently supported at and run either direction from a given component joint.

It is also an object of this invention to provide an accessory mounting system of the type described embodying a novel retaining clip which permits the clip-retaining apertures in each of the panels to be concealed, thus affording a pleasant over-all appearance to the installation.

These as well as other objects of this invention will be readily understood by reference to the following specification and accompanying figures in which:

FIG. 1 is a broken, fragmentary, front-elevational view showing a pair of wall panels prior to their being pushed into abutment with one another;

FIG. 2 is a fragmentary, plan view of the panels in the position shown in FIG. 1;

FIG. 3 is a fragmentary, broken, front-elevational view of a pair of abutting panels which have not yet been interlocked but have been slid into abutment;

FIG. 4 is a cross-sectional view taken along plane IV—IV of FIG. 3;

FIG. 10 is a plan view of the hanger clip;

FIG. 11 is a fragmentary, front-elevational view of a series of four jointed panels illustrating in phantom a series of bookcases, bookshelves or other wall-supported items of furniture supported thereon;

FIG. 12 is a fragmentary, cross-sectional view taken along plane XII—XII of FIG. 9; and FIG. 13 is a side-elevational view of the hanger clip.

Figure 5:
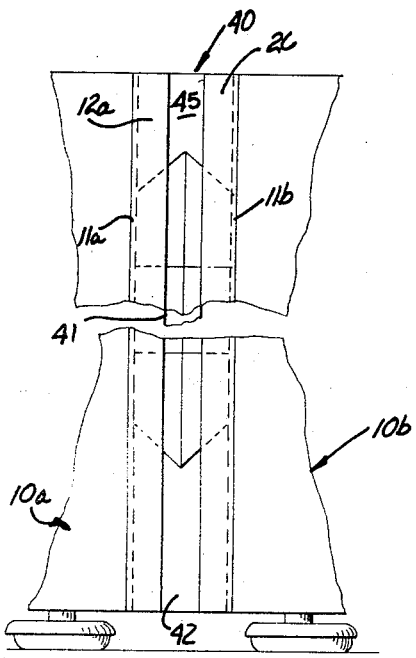
FIG. 5 is a broken, fragmentary, front-elevational view of the panels shown in FIG. 3 with the draw blocks converged to interlock the panel.
Figure 6:
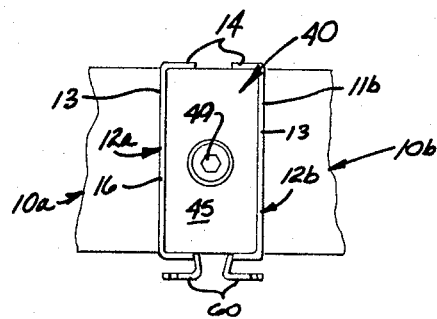
FIG. 6 is a fragmentary plan view of the structure illustrated in FIG. 5.

Briefly, this invention comprises an apparatus for locking together adjacent, vertically disposed spaced divider components at the facing vertical edges thereof. The apparatus includes upper and lower wedging members affixed to each of the facing edges, the upper and lower ones of said wedging members being vertically spaced a substantial portion of the height of the edges. Upper and lower wedge mating members are disposed for movement in a direction parallel to the elongated vertical edge between the facing edges. One of the wedge mating members is adapted to mate with the upper of the wedging members and the other of the wedge mating members is adapted to mate with the lower of the wedging members to force said upper members toward one another and said lower members toward one another when the wedge mating members are moved in opposite directions between the facing edges of the components. Elongated tie bar means are positioned parallel to the elongated vertical edges, the tie bar means connecting the upper and lower wedge mating members. Mechanical advantage means are provided for forcibly varying the effective length of that portion of the tie bar means interconnecting the wedge mating members such that the wedge mating members can be brought into engaging relationship with said wedging members to secure said vertical edges together.

Referring now to the figures, a preferred embodiment of this invention will be described in detail. In FIGS. 1 through 7 there is illustrated a pair of space divider panels 10a and 10b having edges 11a and 11b, respectively. Each of the edges 11a and 11b have a channel-like member, 12a and 12b respectively, affixed thereto by conventional means such as screws or the like. Each of the channel-like members 12 has a base 13 and upstanding flanges 14 (see FIG. 4) to form a channnular recess along the entire vertical length of each of the panel edges.

Figures 8, 9:
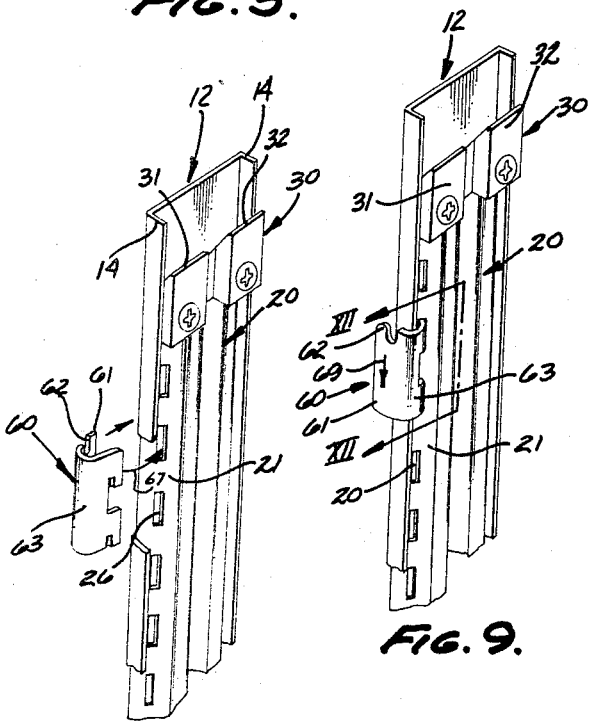
FIG. 8 is an exploded, fragmentary perspective view of the hanger frame and hanger clip.
FIG. 9 is a fragmentary perspective view of the hanger frame showing the clip placed in load supporting position thereon.
Figure 7:
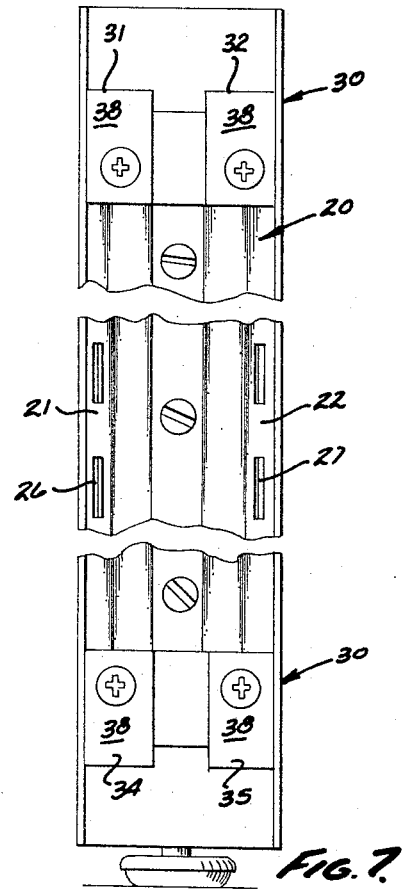
FIG. 7 is a broken, end-elevational view of a typical panel and the joint components affixed thereto.

Referring additionally to FIGS. 7 through 9, the panel interlock assembly, indicated generally by the reference numeral 30, comprises an upper forward wedge block 31, an upper rear wedge block 32, a lower forward wedge block 34 and a lower rear wedge block 35 affixed to the sides of each of the panels 10a and 10b within the channnular recesses 12 and spaced apart a substantial portion of the height of the panels as indicated in the figures. The upper wedge blocks 31 and 32 have upwardly inclined wedging surfaces 33 and the lower wedge members 34 and 35 have downwardly inclined wedging surfaces 36. The space 37 between adjacent wedge blocks is provided for reception of the tie rod 41 to be discussed hereinafter. Planar surfaces 38 are provided on the wedging surfaces and these surfaces, when pulled into abutment, bear the lateral compression forces of the panel joint in a manner to become apparent hereinafter.

The connector assembly, indicated generally by the reference numeral 40, comprises an elongated tie rod or bar 41 having a lower wedging draw block 42 affixed thereto by any conventional means such as a screw 43. The lower wedging draw block 42 has upwardly directed, generally V-shaped wedging surfaces 44 which are adapted to receive the four lower wedging surfaces 36 of the lower wedge blocks 34 and 35. Affixed to the upper extremity of tie bar 41 by means of an elongated screw member 46 is the upper wedging draw block 45. Conveniently, tie rod 41 may be fabricated from a piece of metallic tubing tapped at one extremity as indicated at 47 and the elongated screw member 46 screwed directly therein. The screw member or bolt 46 passes through aperture 48 in the upper draw block 45 and the bolt head 49 shoulders within a suitable recess therein as will be apparent from FIGS. 1 and 2. A compression spring 50 is provided to prevent the upper wedging block 45 from sliding down on bolt 46 to assist in assembly and disassembly of the panel joint as will become apparent.

The upper draw block 45 is provided with generally V-shaped wedging surfaces 53 which are adapted to receive the upper wedging surfaces 33 of the four upper wedge blocks 31 and 32 affixed to the panels 10a and 10b. When it is desired to interlock panels 10a and 10b they are slid into abutment as indicated in FIGS. 3 and 4 with the connector assembly 40 positioned between them such that the upper draw block 45 is above wedging blocks 31 and 32 and draw block 42 is below lower wedging blocks 34 and 35. The screw 46 is then rotated in such a direction as to cause draw blocks 42 and 45 to converge to the position indicated in FIG. 5. As the draw blocks converge under the influence of the effectively shortening tie bar 41, the upper wedging surfaces 33 slidably mate with wedging surfaces 53 on upper draw block 45 and the lower wedging surfaces 36 slidably mate with the wedging surfaces 44 on draw block 42. This causes the wedge blocks 31, 32, 34 and 35 on the adjacent panels to be drawn into rigid abutment at surfaces 38. The resultant connection is structurally rigid. Any tendency which might exist for the connector assembly 40 to slide up or down as viewed in FIG. 2 is obviated by the confinement of tie rod 41 within spaces 37 between the mating sets of upper and lower wedge blocks affixed to the panel walls and, additionally, by the structure of the hanger assembly to be described hereinafter.

The interlocked panel configuration provides a slot 78 on either side formed by the converging flanges 14. Slot 78 provides a means of access to the hanger assemblies 20 as will become apparent hereinafter.

The ease with which the panels can be interlocked may be facilitated by the provision of a positioning clip 51 affixed to the tie rod 41 as illustrated in FIG. 1. Clip 51 is received by mating panel positioning clips 52a or 52b which are affixed to 10a and 10b within channnular recesses 12a and 12b at the approximate positions indicated in FIG. 1. After panel 10a has been vertically positioned, the connector assembly 40 is hung onto it as indicated in phantom in FIG. 1 by means of clips 51 and 52. The compression spring 50 forces the upper draw block 45 to the maximum upper position allowed by the adjustment of screw 46 and, if this adjustment is proper, a single operator may then grasp panel 10b and slide it sideways into abutment with panel 10a. The screw 46 may then be tightened to rigidly interlock the panels in the manner indicated previously. The provision of the mating positioning clips 51 and 52, thus, merely facilitate interconnection of the panels, leaving both of the operator's hands free to position the second panel prior to tightening of the connector assembly 40.

Once a particular space dividing configuration has become outdated or otherwise unusable, the panels may be separated by merely loosening screw 46 such that the upper and lower draw blocks 34 and 42 diverge. As screw 46 is loosened, the positioning clip 51 will again interlock with the positioning clip 52 when draw block 42 has been lowered a sufficient amount to clear the lower wedging blocks affixed to the panel and, as the screw is progressively loosened, spring 50 will push the upper draw block 45 out of engagement with the upper wedging blocks allowing the panels to be easily separated by a single operator.

Preferably, a panel positioning clip is provided on each of the panels to eliminate the necessity of arranging the panels such that one such clip would be provided at every joint. Thus, panel 10a is provided with positioning clip 52a and panel 10b with positioning clip 52b.

Since the panels are usually completely reversible as regards their exterior finishes, the provision of such clips renders them universal from all standpoints, markedly adding to the convenience and utility of the entire system.

Referring now particularly to FIGS. 2, 4 and 7 through 13, the details of the novel accessory hanger bracket and clip assembly will be described. The hanger bracket assembly, indicated generally by the reference numeral 20, is positioned within channular recess 12 on each edge of each of the panels or other components forming a part of the system. The hanger bracket assembly 20 may be affixed to the panel by any conventional means such as screws. The assembly has a forward inclined surface 21 and a rear inclined surface 22. These surfaces initiate longitudinally adjacent the interior bases of flanges 14 and converge toward one another away from the panel edge as shown best in FIG. 2. The hanger bracket assembly 20 is completed by two forward connecting members 24, two rearwardly extending members 25 and a connecting web 29. The hanger bracket assembly 20, preferably, may be integrally fabricated from steel or the like by conventional rolling methods.

Each of the surfaces 21 and 22 are provided with a plurality of aligned slots. Thus forwardly inclined surface 21 has slots 26 punched therein and rear inclined surface 22 has slots 27 punched therein. The slots communicate with a void area 28 between the surfaces and the base 13 of channular recess 12 resulting from the transverse disposition of the surfaces with respect thereto. The resulting configuration provides two generally box-like beams extending vertically within each of the channular recesses 12, each of the beams having a sloped exterior surface as viewed from the front of the panel. The slots 26 and 27 are positioned with respect to members 22 and 23 such that overlapping flanges 14 render them invisible when viewed from the front of the panel, thus adding to the aesthetic properties of the over-all system.

The retainer clip 60, adapted for utilization in conjunction with the hanger frame assembly 20, has an accessory restraining section 61 having an accessory hook or niche 62 formed therein. The accessory restraining section 61 is integrally connected by means of a curved shank section 63 to a pair of hanger frame engaging hooks 64. The hooks 64 have a detent 65 depending from their rearmost extremities. The hanger frame engaging hooks 64 have a vertical dimension 68 which is slightly less than the vertical dimension of the slots 26 and 27. The hook is inserted at any desired height, as shown in FIGS. 8 and 9, by rotating it as indicated generally by the arrows 67 about vertical axes around the edge of flange 14 until the hook sections 64 protrude through the slots 26 or 27 into the void area 28 between the inclined surface and the base 13 of channular recess 12. Once this rotation has been completed, the clip 60 is moved downwardly as indicated by the arrow 69 in FIG. 9 until detents 65 lock the clip into the position illustrated in FIG. 12. Preferably, tolerances are kept such that the hanger bracket is engaged between facing compressing surfaces 66 on detents 65 and shank section 63 with sufficient firmness to prevent undesirable rotation of the clip during the hanging of the desired accessory.

As will be readily apparent from an examination of FIG. 2, each edge of each particular panel is capable of functioning independently of its abutting panel to support any particular accessory by means of the retainer clip 60. Thus, it is necessary to provide both right and left-handed clips for insertion into the various hanger bracket assemblies. The provision of such clips, however, allows a given accessory to be supported completely on one panel, independent (except, of course, for vertical stability) upon the presence of the other panels within the system. Thus, as viewed in FIG. 11, bookshelves or the like 70 are shown supported on a panel 71 which is rigidly interlocked between panels 72 and 73. Should it be desirable to reposition the various wall panels for a new use, the various connector assemblies 40 may be removed and panel 71 moved to a new position without removing the shelves 70 therefrom and, when the panel is re-locked into its new position, utilization of the shelves may be resumed. Additionally, if desired, a chest 75 might be supported at the juncture between panels 71 and 72 by means of a retaining clip inserted into the hanger bracket assembly 20 associated with the right edge of panel 72 and extended from that point to a second support on the left-hand edge of panel 72. Preferably, the accessories are designed such that their edges do not overhang the center line of slots 78 (between facing flanges 14 of interlocked panels). This permits independently supported accessories to run in either direction from a given panel joint at identical or overlapping heights above the floor. Similarly, the configuration of curved shank section 63 of clip 60 should be such that they do not overhang the centerline of slots 78 (see FIG. 6) to permit their insertion into facing hanger slots on two adjacent panels at the same vertical height.

Thus, it will be seen that this invention has provided a novel, interlock and hanging system particularly adapted for utilization in a space-divider system. While the interlock and hanger system has been illustrated with particular reference to divider panels, it will be readily understood by those skilled in the art that other types of divider components such as cornering posts and the like might well be connected by the interlock system which is the subject of this invention. Thus, the panel 10a shown in FIG. 1 might be replaced by a cornering post having a second edging assembly affixed thereto and displaced therefrom the desired angle. Such a system is shown, for example, in the co-pending application noted above with the exception, of course, that the interlock and hanging components are not fabricated in accordance with the specific teachings of the present invention.

While a preferred embodiment of this invention has been illustrated in detail, it will be readily apparent to those skilled in the art that many other embodiments may be conceived and fabricated without departing from the spirit of this specification and the accompanying drawings. Such other embodiments are to be deemed as included within the scope of the following claims unless these claims, by their language, expressly state otherwise.

We claim:

1. In a room having a plurality of vertically disposed spaced divider components, each of said components having an elongated vertical edge, and means for locking together adjacent of said components at the facing vertical edges thereof, the improvement of said locking means comprising:

upper and lower wedging members affixed to each of said facing edges, the upper and lower ones of said wedging members being vertically spaced a substantial potrion of the height of the edges;

upper and lower wedge mating members disposed for movement in a direction parallel to said elongated vertical edges between said facing edges, one of said wedge mating members being adapted to mate with the upper of said wedging members and the other of said wedge mating members being adapted to mate with the lower of said wedging members to force said upper members toward one another and said lower members toward one another when said wedge mating members are moved in opposite directions between said facing edges;

elongated tie bar means positioned parallel to said elongated vertical edges and lying therebetween, said bar means interconnecting said upper and lower wedge mating members; and mechanical advantage means for forcibly varying the effective length of that portion of said tie bar means interconnecting said wedge mating members whereby said wedge mating members can be brought into engaging relationship with said wedging members to secure said vertical edges together.

2. The structure as set forth in claim 1 which further comprises means affixed to one of said components for supporting said tie bar, wedge mating members and advantage means prior to locking together of said components by said advantages means.

3. The structure as set forth in claim 2 wherein said wedge mating members are positioned above and below said wedging members; wherein said mechanical advantage means shortens the effective length of said tie bar means to bring said wedge mating members into engaging relationship; and which further comprises biasing means for maintaining the upper of said wedge mating members in elevated position with respect to the upper of said wedging members prior to shortening of said tie bar by said advantage means.

4. The structure as set forth in claim 2 which further comprises biasing means for maintaining one of said wedge mating members in vertically spaced relationship with respect to its associated wedging members prior to the varying of the effective length of said tie bar means to bring said wedging members and wedge mating members into engaging relationship.

5. The structure as set forth in claim 4 wherein said supporting means includes means for permitting disengagement thereof from said tie bar, wedge mating members and advantage means as said wedging members and wedge mating members are engaged and means for achieving re-engagement thereof in supporting fashion when said wedging members and wedge mating members are disengaged.

6. The structure as set forth in claim 1 wherein said tie bar mean has at least two sections and wherein said mechanical advantage means comprises screw means connecting said sections together.

7. The structure as set forth in claim 1 which further comprises a first support member secured to the vertical edge of one of said components intermediate the top and bottom thereof; said support member projecting outwardly from said edge; a second support member affixed to said tie bar means and projecting outwardly therefrom to engage said first support member to detachably mount said locking means on said first component while the second of said components is moved into position to be locked to said first component.

8. The structure set forth in claim 7 wherein said wedge mating members are positioned above and below said wedging members; wherein said mechanical advantage means shortens the effective length of said tie bar means to bring said wedge mating members into engaging relationship; and which further comprises resilient biasing means for maintaining the upper of said wedge mating members in elevated position with respect to the upper of said wedging members prior to shortening of said tie bar by said advantage means.

9. The structure as set forth in claim 1 wherein each of said upper wedging members has an upwardly inclined upper surface diverging from its associated edge into the space between said facing edges; and wherein each of said lower wedging members has a downwardly inclined lower surface diverging from its associated edge into the space between said facing edges.

10. The structure as set forth in claim 9 wherein said upper wedge mating member has a generally V-shaped recess therein facing and movable downwardly toward said upper pair of wedging members and wherein said lower wedge mating member has a generally V-shaped recess therein facing and movable upwardly toward said lower pair of wedging members whereby, as said upper and lower wedge-mating members are moved toward each other said V-shaped recesses receive said inclined surfaces to compress said facing edges together.

References Cited

UNITED STATES PATENTS 3,081,718    3/1963    Shoffner _____ 52—36 X

FOREIGN PATENTS 651,542    4/1951    England.

CARL W. TOMLIN, *Primary Examiner.*

WAYNE L. SHEDD, *Assistant Examiner.*

U.S. Cl. X.R.

52—27, 584; 248—243